(12) United States Patent
Jagota

(10) Patent No.: US 11,157,508 B2
(45) Date of Patent: Oct. 26, 2021

(54) ESTIMATING THE NUMBER OF DISTINCT ENTITIES FROM A SET OF RECORDS OF A DATABASE SYSTEM

(71) Applicant: salesforce.com, inc., San Francisco, CA (US)

(72) Inventor: Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 311 days.

(21) Appl. No.: 16/449,333

(22) Filed: Jun. 21, 2019

(65) Prior Publication Data

US 2020/0401595 A1    Dec. 24, 2020

(51) Int. Cl.
| | | |
|---|---|---|
| *G06F 16/25* | (2019.01) | |
| *G06F 16/2455* | (2019.01) | |
| *G06F 16/28* | (2019.01) | |
| *G06F 16/23* | (2019.01) | |

(52) U.S. Cl.
CPC ...... *G06F 16/252* (2019.01); *G06F 16/24564* (2019.01); *G06F 16/288* (2019.01); *G06F 16/23* (2019.01)

(58) Field of Classification Search
None
See application file for complete search history.

(56) References Cited

U.S. PATENT DOCUMENTS

| | | | |
|---|---|---|---|
| 7,730,478 B2 | 6/2010 | Weissman | |
| 8,521,758 B2 | 8/2013 | Nachnani et al. | |
| 8,620,901 B2 | 12/2013 | Jagota et al. | |
| 8,972,336 B2 | 3/2015 | Jagota | |
| 9,026,552 B2 | 5/2015 | Jagota | |
| 9,477,698 B2 | 10/2016 | Jagota | |
| 9,619,534 B2 | 4/2017 | Jagota | |
| 9,646,246 B2 | 5/2017 | Jagota | |
| 9,740,743 B2 | 8/2017 | Jagota et al. | |
| 9,760,620 B2 | 9/2017 | Nachnani et al. | |
| 9,977,797 B2 | 5/2018 | Jagota et al. | |
| 10,110,533 B2 | 10/2018 | Jagota | |
| 10,152,497 B2 | 12/2018 | Doan et al. | |
| 10,163,056 B2 | 12/2018 | Fuchs et al. | |
| 10,354,264 B2 | 7/2019 | Jagota et al. | |
| 10,373,046 B2 | 8/2019 | Vijayant et al. | |
| 10,397,249 B2 | 8/2019 | Gurkok et al. | |
| 10,467,412 B2 | 11/2019 | Gurkok et al. | |
| 2012/0089638 A1 | 4/2012 | Jagota et al. | |
| 2013/0031061 A1 | 1/2013 | Jagota | |
| 2013/0117287 A1 | 5/2013 | Jagota et al. | |

(Continued)

*Primary Examiner* — Christopher J Raab

(74) *Attorney, Agent, or Firm* — NDWE, LLP

(57) ABSTRACT

A method and system for estimating a number of distinct entities in a set of records are described. For each one of a subset of records, a set of match rule keys are generated based on a set of match rules. Each match rule from the set of match rules defines a match between records, and each match rule key from the set of match rule keys includes at least a key field value. A high order key for the record is determined based on the match rule keys, and a counter associated with the high order key is incremented. When each record from the subset of records has been processed by determining the match rule keys, and incrementing the counter(s) of the high order keys, a sum of a number of counters that have a non-zero value is performed to estimate the distinct entities in the records.

24 Claims, 9 Drawing Sheets

(56) References Cited

U.S. PATENT DOCUMENTS

| | | |
|---|---|---|
| 2014/0025683 A1 | 1/2014 | Howland et al. |
| 2016/0125347 A1 | 5/2016 | Jagota et al. |
| 2016/0125442 A1 | 5/2016 | Jagota et al. |
| 2016/0140355 A1 | 5/2016 | Jagota et al. |
| 2016/0378759 A1 | 12/2016 | Jagota et al. |
| 2016/0379265 A1 | 12/2016 | Jagota et al. |
| 2016/0379266 A1 | 12/2016 | Jagota et al. |
| 2017/0060919 A1 | 3/2017 | Ramachandran et al. |
| 2017/0061325 A1 | 3/2017 | Jagota et al. |
| 2017/0242891 A1 | 8/2017 | Doan et al. |
| 2017/0277768 A1 | 9/2017 | Doan et al. |
| 2017/0286441 A1 | 10/2017 | Doan et al. |
| 2017/0316361 A1 | 11/2017 | Jagota et al. |
| 2018/0157988 A1 | 6/2018 | Jagota et al. |
| 2018/0165281 A1 | 6/2018 | Jagota et al. |
| 2018/0165294 A1 | 6/2018 | Jagota et al. |
| 2018/0165354 A1 | 6/2018 | Jagota et al. |
| 2018/0373732 A1 | 12/2018 | Jagota et al. |
| 2019/0236178 A1 | 8/2019 | Jagota et al. |
| 2019/0236460 A1 | 8/2019 | Jagota et al. |
| 2019/0236475 A1 | 8/2019 | Jagota et al. |

DETERMINE THAT A SET OF ONE OR MORE SUB-KEYS FOR THE RECORD INCLUDES AT LEAST ONE SUB-KEY THAT IS DIFFERENT FROM THE HIGH ORDER KEY, WHERE EACH ONE FROM THE SET OF SUB-KEYS IS BASED AT LEAST IN PART ON A MATCH RULE KEY FROM THE SET OF MATCH RULE KEYS AND IS FORMED FROM FEWER KEY FIELD VALUES THAN ALL KEY FIELD VALUES OF THE HIGH ORDER KEY
222

YES

DECREMENT ONE OR MORE SUB-KEY COUNTERS, WHERE EACH ONE OF THE SUB-KEY COUNTERS IS ASSOCIATED WITH A RESPECTIVE SUB-KEY FROM THE SET OF SUB-KEYS
224

Fig. 2B

GENERATE, BASED ON A SET OF TWO OR MORE MATCH RULES, A SET OF MATCH RULE KEYS, WHERE EACH MATCH RULE FROM THE SET OF MATCH RULES DEFINES A MATCH BETWEEN RECORDS
202

GENERATE A RESPECTIVE A FIRST SET OF KEY FIELDS FROM A SET OF FIELDS VALUES OF THE RECORDS THAT CORRESPOND TO THE SET OF FIELDS IDENTIFIED IN THE MATCH RULE KEY
242

GENERATE A MATCH RULE KEY THAT CORRESPOND TO THE MATCH RULE WHEN ALL THE RESPECTIVE FIRST SET OF KEY FIELDS ARE NON-NULL
244

ESTIMATING THE NUMBER OF DISTINCT ENTITIES FROM A SET OF RECORDS OF A DATABASE SYSTEM

TECHNICAL FIELD

One or more implementations relate to the field of database system; and more specifically, to the estimation of a number of distinct entities from a set of records of a database system.

BACKGROUND ART

A database may comprise one or more database objects that are managed by a Database Management System (DBMS), each database object may include a number of records, and each record may comprise of a set of values of multiple field types. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object).

Typically a database includes duplicate records representing a single unique entity. For example, when the database includes records representing a person (e.g., a record with the following fields: person name, phone, email, street address, etc.), a same person can be represented by one or multiple records in the database. Some records may include identical values in the same field types. Alternatively, two records identifying the same entity may have different values for the same field type. For example, a person's name may be spelled differently (e.g., John Smith and J. Smith) in two different records, however, these two records are likely to refer to the same entity, here the same person. In other examples, two records may be incomplete and may share some values of field types and have incomplete values for the remaining field. Referring back to the example of a record identifying a person, a first record may include a name of the person and the email address of the person and a second record may include the name of the person and a phone number of the person. In this example, while the first record and the second record have incomplete fields, they correspond to the same entity (e.g., they share the same name of a person) and should be considered as a duplicate of the same entity.

Determining the number of unique entities in a set of records of a database system is a complex problem. Several approaches of determination of the number of unique entities exist. Some existing approaches rely on performing a matching operation to determine the records that match other records in the set of records, and a clustering operation to determine from the matched records the ones that correspond to an identical entity. However, this approach is computationally complex. For example the matching operation may include a pair-wise comparison of all of the records or a significantly large subset of the records—resulting in a computationally complex operation.

Other approaches may use probabilistic counting procedures built based on a hashing function that is applied on the records and outputs a scalar. While these approaches can provide a more efficient mechanism of estimating the number of unique entities in a set of records than the matching/clustering mechanisms, they remain complex to apply to a set of records in which the records contain several field types and where the records may not include defined values for all the field types.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 2B illustrate a flow diagram of exemplary operations that can be performed for decrementing counters, in accordance with some implementations.

FIG. 2C illustrates a flow diagram of exemplary operations that can be performed for generating match rule keys, in accordance with some implementations.

DETAILED DESCRIPTION

The following description presents methods and apparatus for estimating the number of distinct entities from a set of records of a database system. The inventive concept presented herein allows to estimate the number of distinct entities from a set of records in a database system. The estimation is performed in one pass over the set of records. The approach presented herein can be used to efficiently and quickly assess the number of distinct entities in the set of records. The approach may further be used to estimate the average number of duplicates the set of records includes.

In the implementations described the estimation of distinct entities in a set of records is performed without performing any matching or clustering operations. As it will be described below in further details, the estimation of the number of entities in the set of records can be performed in one pass over the set of records significantly increasing the performance of the estimation operation when compared with existing estimating mechanisms. The mechanisms presented herein can be used to perform a quick light weight assessment of distinct entities in a data set. For example, these mechanisms can be used in a multi-tenant system to assess the number of distinct entities of a record type (e.g., an estimate of distinct customers of a tenant) for a given tenant from multiple tenants. The number of estimated distinct entities can be used, when compared to the total number of records in the data set, to estimate the average number of duplicates included in the set of records.

In one implementation, a method and system for estimating a number of distinct entities in a set of records are described. The estimation of the number of distinct entities in a subset of records is performed by performing several operations for each one of a subset of records from the plurality of records. The subset of records can be the entire set of records stored in the database system or alternatively a subset of the records that is less than the entire set of records. The operations include generation of a set of match rule keys, based on a set of match rules. Each match rule from the set of match rules defines a match between records, and each match rule key from the set of match rule keys includes at least a key field value. The operations further include the determination of a high order key for the record, based on the match rule keys, and the incrementation of a counter associated with the high order key. When each record from the subset of records has been processed by determining the match rule keys, and incrementing the counter(s) of the high order keys, a determination of a sum of a number of counters that have a non-zero value is performed to estimate the distinct entities in the plurality of records. The counters include the counter associated with the high order key of each one of the subset of records.

Figure 1A:
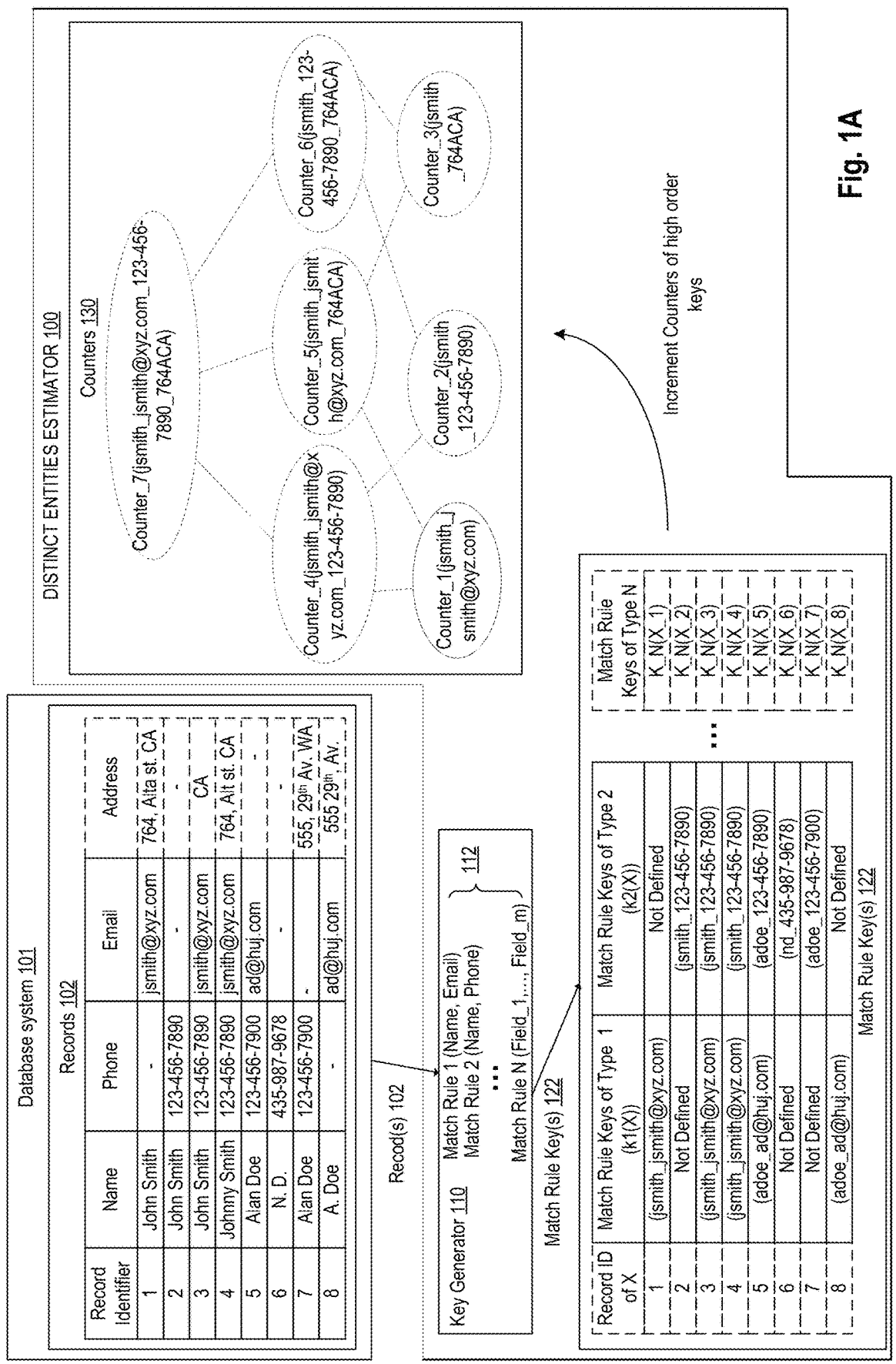
FIG. 1A is a block diagram illustrating a system and exemplary records that can be used for estimating a number of distinct entities in the set of records of a database system, according to some example implementations.

FIG. 1A is a block diagram illustrating a system and exemplary records that can be used for estimating a number of distinct entities in the set of records of a database system, according to some example implementations. The system includes a database system 101 and a distinct entities estimator 100. The distinct entities estimator 100 includes a key generator 110, match rule keys 122, and a set of counters 130. The distinct entities estimator 100 is operative to estimate the number of distinct entities in the set of records 102. Determining the number of distinct entities/elements can be referred to as determining the cardinality of the set of records 102.

In some implementations, the database system 101 may store the records 102. In other implementations, the database system 101 may include one or more streaming applications that continuously output the records 102 to the key generator 110. A record from the records 102 typically includes multiple values of different field types. Each field type represents a different type of information for the record. Each one of the records 102 can include n field types denoted i=1, 2, . . . , n respectively. $x_1, x_2, \ldots, x_n$ denote the values of the n field types in a particular record x. Any of these values may be null. For example, the database system 101 may include records 102 representing contact persons. While the implementations herein will be described with a contact person as a type for the records 102, in other implementations different types of records can be included in the database system 101 and the operations described herein can be performed to estimate the number of distinct entities for these records in a similar manner as descried herein.

A record of a contact person can include one or more of the following fields: first name, last name, phone number, email address, street address, city, zip code, and one or more additional fields that may be specific to a contact person or the identification of the record in the database system. In the illustrated example the records 102 include 8 records, each associated with a respective record identifier 1 to 8. In one implementation, each record may include values of three field types: Name, Phone, and Email. In another implementation, each record may include field values of four field types: Name, Phone, Email, and Address. While the examples presented herein include records with three or four field values, in other implementations a different number of field values can be contemplated without departing from the scope of the present inventive concept.

As shown in FIG. 1A, some records, e.g., records 3, may include values for all of the field types. Alternatively, other records, such as records 1-2 and 4-8, include values to a portion of the field types. These records can be referred to as incomplete records, in which all the field types may not have a corresponding value. Further records 102 include duplicates of an entity. For example, record 1, record 2, record 3, and record 4 are likely duplicates of the same entity; and record 5, record 7, and record 8 are likely duplicates of another entity. Record 6 is likely an entity that is different from the entity of records 1-4, and from the entity of records 5, and 7-8.

The distinct entities estimator 100 includes a key generator 110. The key generator 110 is operative to determine a set of match rule keys 122, based on the match rules 112, for the records 102. The key generator 110 includes the set of match rules 112. Each match rule from the set of match rules defines a match between records. In other words, the match rule can be seen as a criteria to be used for matching two records of a same record type. A match rule may include a set of one or more field types from the field types of a record indicating that for two records to match, based on the match rule, the field values of the two records corresponding to the set of field types need to match. In a formal notation, a match rule R is specified by a particular subset $R \subseteq \{1, 2, \ldots, n\}$ of the field types of a record. Two records x and y are said to match on R if and only if $x_i$ matches $y_i$ for every i in R. In order for $x_i$ to match $y_i$ both values must be non-null. The definition of whether $x_i$ matches $y_i$ or not can be determined based on the field type. For example, a field type including values of email addresses may not have the same matching criteria as a field type including values of a phone number or a name. In the example of FIG. 1A, the records have three fields—name, phone, and email address—and two match rules are defined: a first match rule, match rule 1, where a name matches and email matches, and a second match rule, match rule 2 where a name matches and phone matches.

In some implementations, each match rule from the set of match rules is non-redundant with the other match rules from the set of match rules. The rules are non-redundant when no match rule from the set of match rules includes another match rule as a subset. For example, each match rule is defined based on a different set of field types than the other fields types of any other match rule. While a match rule can have a field type that is included in the field types of another match rule, all of the field types of the match rule cannot be included in the set of field types of another match rule. Match rule 1 is defined with the field types "Name," and "Email;" and match rule 2 is defined with the field types "Name," and "Phone." The first and the second match rule are non-redundant as the field types that are included in each match rule are different. The first match rule includes a field type "Email" that is not present in the second match rule and the second match rule includes a field type "Phone" that is not present in the first match rule. The examples herein will be described with respect to match rule 1 and match rule 2, however, the set of match rules may include more than two match rules (up to match rule N). Alternatively, the set of match rules may include a single match rule.

The key generator 110 generates a set of match rule keys 122, based on the set of match rules 112. A match rule key can be expressed as the key $k_R(x)$ associated with a match rule R. For example, the match rule key $k_R(x)$ is a tuple of key field values, derived from the values in x of the individual field types defined in the match rule R, i.e.: $k_R(x)=(k_1(x_1), k_2(x_2), \ldots, k_i(x_i), \ldots, k_{ik}(x_{ik}))$. In some implementations, when at least one key field value is null, then $k_R(x)$ is also set to a null value or not defined.

A key field value is determined from a corresponding field value identified in the match rule key. A key field value $k_i(x_i)$ is a representation of a field value $x_i$. The key field value $k_i(x_i)$ is generated from the field value $x_i$ of a field type i for a given record x. The key field value $k_i(x_i)$ can be a modified version of the value $x_i$ of field i in record x. As an example, a person name key may be obtained by concatenating the first letter of the first name with the complete last name (after stripping trailing white spaces and down-casing both values). When $x_i$ is null, $k_i(x_i)$ is also null. Referring to the example of record 1, record 2, record 3, and record 4, "j smith" is generated as a key field value associated with the first field of each one of the records. While the first field of each one of the records 1, 2, 3, and 4 may not include the same field value, the generated key field value can be the same. For example, the records 1 and 4 have respective field values "John Smith," and "Johnny Smith" and the key field value for both is "j smith." Referring to the example of records 5, 7, and 8 "adoe" is generated as a key field value associated with the first field including the values "Alan Doe," "Alan Doe," and "A. Doe" respectively.

The determined key field values are used to generate the match rule key(s) for the records based on the match rules 112. For example, for record 1: "John Smith, -, jsmith@xyz.com, 764, Alta St. CA" the following key (jsmith_jsmith@xyz.com) is generated from match rule 1, based on the field Name and the field Email identified in the first match rule. For record 1, there is no match rule key generated based on match rule 2, as record 1 does not include a phone number in the "Phone" field. In a second example, for record 2, "John Smith, 123-456-7890," the following key (jsmith_123-456-7890) is generated from match rule 2, based on the field "Name" and the field "Phone." For this same record, there is no match rule key generated based match rule 1, as the second record does not include a value in the "Email" field. In another example, record 3 results in the generation of two match rule keys (jsmith_jsmith@xyz.com) and (jsmith_123-456-7890) as illustrated at the row 3 of the match rule key(s) 122. The process is repeated for each one of the records 1 to 8, and for each record one or more match rule keys are generated based on the match rules 112 resulting in the set of match rule keys 122. In some implementations, when the key generator 110 includes N match rules, for each record there may be up to N match rule key associated with the N match rule keys. Generally, the match rule keys are generated in order to approximate the following: two records x and y have the same value of the key associated with match rule R if and only if both records match on match rule R.

Based on the match rule keys 122, counters 130 are defined and incremented. A high order key is determined from the set of match rule keys that are generated for the record. The high order key is formed from all unique field values that are included in the set of match rule keys. In some implementations, the high order key can be expressed as a union of match rule keys. For a record x and match rule keys $k_{R_1}(x), k_{R_2}(x), \ldots, k_{R_p}(x)$ defined based on match rules $R_1, \ldots, R_p$, where p>1, the union of these p match rule keys can be defined as:

$$\cup_{i=1}^{p} k_{R_i}(x) = k_R(x), \text{ where } R = \cup_{i=1}^{p} R_i \qquad (1)$$

In some implementations, when the set of match rule keys generated for a record includes a single match rule key, the high order key for the record is the match rule key itself. In other implementations, the set of match rule keys may include more than one match rule key and the high order key is formed from field values from two or more match rule keys. The high order key for record 1 is the match rule key generated for record since the record has only a single match rule key. In contrast, the record 3 has two distinct match rule keys ("jsmith_jsmith@xyz.com" and "jsmith_123_456_7890") that are generated based on the match rules. Therefore, for record 3 the high order key is a key formed based on key field values from the two match rule keys. For example, the high order key includes all unique and non-duplicated key field values that are part of all of the match rule keys. The high order key of record 3 is "jsmith_jsmith@xyz.com_123-456-7890."

For each record from the records 102, the counter associated with the high order key is incremented. In some implementations, the high order key is the match rule key of the record and the counter is associated with the match rule key. Record 1 has a single associated match rule key, and the high order key for the record is the match rule key, therefore counter_1, which is associated with the match rule key, is incremented. Alternatively, record 3 has two match rule keys and consequently, the high order key is a composite key that is generated from the fields in the two match rule keys. In this example, counter_4 that is associated with the high order key "jsmith_jsmith@xyz.com_123-456-7890" is incremented.

The determination of the high order key and the incrementation of the associated counter is performed for each one of the records to obtain the counters 130. In some implementations, when the example uses two match rules (e.g., match rule 1 and match rule 2), the counters 1, 2 and 4 can be generated. In another example, when there are more than two match rules and the records may include additional fields (e.g., the address field), the counters can include the counters 1 to 7. The values of the counters can then be used to determine an estimate of the number of distinct entities in the set of records 102. In some implementations, a sum of the number of counters that have a non-zero value is determined as the estimate of the distinct entities in the plurality of records. The processing of the records 102 with the generation of the match rule keys and high order keys, and the use of counters that maintain counts of the number of occurrences of these keys allow an efficient estimation of the number of distinct entities in the set of records 102. When the process terminates, $\Sigma_{k:C(k)>0} C(k)$ represents the estimate of the number of distinct entities in the set of records.

Figure 1B:
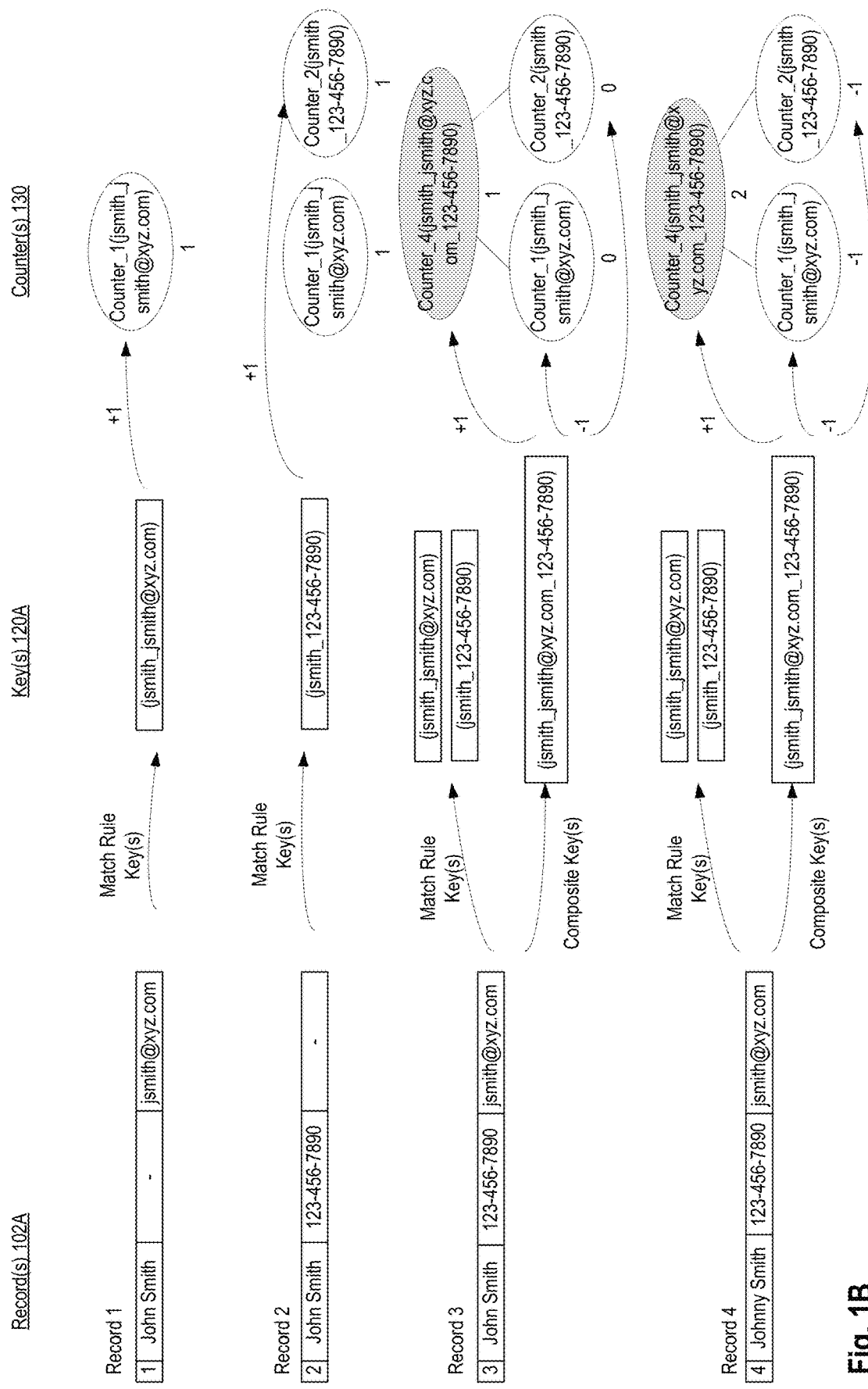
FIG. 1B is a more detailed block diagram illustrating the use of counters associated with keys determined based on match rules to estimate the number of distinct entities in a set of records, according to some example implementations.

FIG. 1B is a more detailed block diagram illustrating the use of counters associated with keys determined based on match rules to estimate the number of distinct entities in a set of records, according to some example implementations. The implementations of FIG. 1B will be described with the subset 102A from the records 102 and the first match rule key and the second match rule key described above. The subset of records 102A includes records 1, 2, 3, and 4, which are likely to relate to the same distinct person entity John Smith.

Upon receipt of record 1, a match rule key is generated based on the set of match rules previously defined. According to the field values of record 1, the second match rule key (Name, Phone) yields an undefined match rule key as record 1 does not include a value of a phone number. Therefore a single match rule key (jsmith_jsmith@xyz.com) results for record 1, based on the match rules. As there is no other match rule key, the high order key for record 1 is also the match rule key. Counter_1 that is associated with the high order key is incremented to a value of 1.

Upon receipt of record 2, a match rule key is generated based on the set of match rules. According to the field values of record 2, the first match rule key (Name, Email) yields an undefined match rule key as record 2 does not include a value of an email address. Therefore, a single match rule key (jsmith_123-456-7890) results for record 2, based on match rule 2. As there is no other match rule key, the high order key for record 2 is also the match rule key. Counter_2 that is associated with the high order key is incremented to a value of 1. Since record 2 is not associated with the key of Counter_1, Counter_1 is not incremented and remains at a value of 1.

Upon receipt of record 3, two match rule keys are generated based on the set of match rules, one for each one of the match rules. According to the field values of record 3, the first match rule key (Name, Email) causes the generation of the match rule key (jsmith_jsmith@xyz.com) and the second match rule key causes the generation of the match rule key (jsmith_123-456-7890). Since there are two match rule keys for record 3, the high order key for record 3 is a union of the two match rule keys. The high order key is different from each one of the match rule keys and is a composite key including key field values from each one of the match rule keys. For example, the high order key is "jsmith_jsmith@xyz.com_123-456-7890." Counter_3 that is associated with the high order key is incremented to a value of 1.

In some implementations, the counters, Counter_1 and Counter_2, that are associated with sub-keys of the high order key are decremented for record 3. In the illustrated example, the sub-keys of the high order key are the match rule keys of record 3 and are respectively associated with Counter_1 and Counter_2. These counters are respectively decremented by 1 to a value of 0. In some embodiments, the counters can be decremented by another value. For example, the counters can be decremented by infinity (or a very large integer value that is greater than the total number of records in the set of records).

Upon receipt of record 4, two match rule keys are generated based on the set of match rules, one for each one of the match rules. According to the field values of record 4, the first match rule key (Name, Email) causes the generation of the match rule key (jsmith_jsmith@xyz.com) and the second match rule key causes the generation of the match rule key (jsmith_123-456-7890). Since there are two match rule keys for record 4, the high order key for record 4 is a union of the two match rule keys. The high order key is different from each one of the match rule keys and is a composite key including key field values from each one of the match rule keys. For example, the high order key is "jsmith_jsmith@xyz.com_123-456-7890." In this example, the high order key of record 4 is the same as the high order key of record 3. Counter_4 that is associated with the high order key is incremented to a value of 2.

In some implementations, the counters, Counter_1 and Counter_2, that are associated with sub-keys of the high order key are decremented for record 4. In the illustrated example, the sub-keys of the high order key are the match rule keys of record 4 and are respectively associated with Counter_1 and Counter_2. These counters are respectively decremented by 1 to a value of −1. In some embodiments, the counters can be decremented by another value. For example, the counters can be decremented by infinity (or a very large integer value that is greater than the total number of records in the set of records). This process may continue for all records from record 102. When a key associated with one of the counters Counter_1, Counter_2, and Counter_4 is generated, the highest order key counter is incremented, and the counters of the sub-keys are decremented. The value of Counter_4 is greater than zero (or greater than or equals to 1) and will be used in the estimation of the distinct entities of the records 102. The Counter_4 is to be counted as a single entity. Consequently resulting in the records 1, 2, 3, and 4 being counted as a single entity instead of four.

While in the implementation described above with respect to FIG. 1B, a sub-key of the high order key is a match rule key, in some implementations, a sub-key of the high order key can be a composite key. For example, when the records include additional fields, e.g., an additional address field, the high order key can be a key including key field values from the four fields (e.g., name, email, phone, and address), and a sub-key can be either an intermediary composite key including three key field values (e.g., one of (name, phone, email), (name, phone, address), (name, email, address), etc.) or a match rule key. Referring to the example of FIG. 1A, if a high order key associated with Counter_7 is determined for a given record, Counter_7 is incremented and the counters Counter_4, Counter_5, Counter_6, Counter_1, Counter_2, and Counter_3 are decremented.

Decrementing counter(s) associated with sub-keys of a high order key enables the present distinct estimation mechanisms to prevent over-counting duplicate entities—specifically when the highest-order key of one record is a subkey of the highest-order key of another record. When a record results in having a high order key that is a sub-key of a high order key of another record (e.g., record 1 and record 3, in which the high order key of record 1 is "jsmith_jsmith@xyz.com" which is a sub-key of the high order key of record 3 "jsmith_jsmith@xyz.com_123-456-7890"), this is an indication that both records represent the same person entity.

Figure 1C:
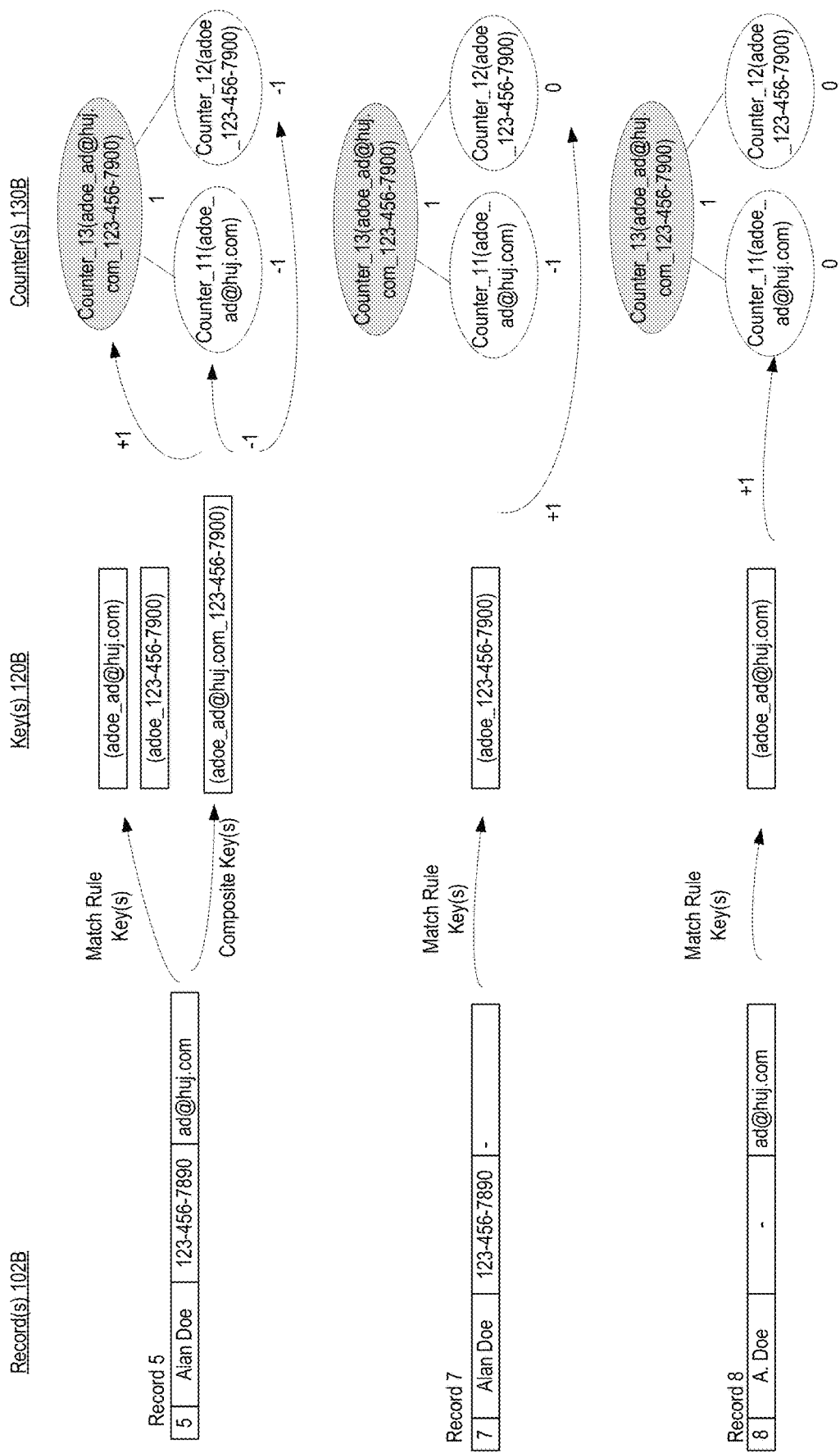
FIG. 1C is a more detailed block diagram illustrating the use of counters associated with keys determined based on match rules to estimate the number of distinct entities in a set of records, according to some example implementations.

FIG. 1C is a more detailed block diagram illustrating the use of counters associated with keys determined based on match rules to estimate the number of distinct entities in a set of records, according to some example implementations. The implementations of FIG. 1C will be described with the subset of records 102B from the records 102 and the first and second match rule keys described above. The subset of records 102B includes records 5, 7, and 8, which are likely to relate to the same distinct person entity: Alan Doe.

Upon receipt of record 5, two match rule keys are generated based on the set of match rules, one for each one of the match rules. According to the field values of record 5, the first match rule key (Name, Email) causes the generation of the match rule key (adoe_ad@huj.com) and the second match rule key causes the generation of the match rule key (adoe_123-456-7900). Since there are two match rule keys for record 5, the high order key for record 5 is a union of the two match rule keys. The high order key is different from each one of the match rule keys and is a composite key including key field values from each one of the match rule keys. For example, the high order key is "adoe_ad@huj.com_123-456-7900." Counter_13 that is associated with the high order key is incremented to a value of 1.

In some implementations, the counters, Counter_11 and Counter_12, that are associated with sub-keys of the high order key are decremented for record 5. In the illustrated example, the sub-keys of the high order key are the match rule keys of record 5 and are respectively associated with Counter_11 and Counter_12. These counters are respectively decremented by 1 to a value of −1. In some embodiments, the counters can be decremented by another value. For example, the counters can be decremented by infinity (or a very large integer value that is greater than the total number of records in the set of records).

Upon receipt of record 7, a match rule key is generated based on the set of match rules. According to the field values of record 7, the first match rule key (Name, Email) yields an undefined match rule key as record 7 does not include a value of an email address. Therefore, a single match rule key (adoe_123-456-7900) results for record 7. As there is no other match rule key, the high order key for record 7 is also the match rule key. Counter_11 that is associated with the high order key is incremented to a value of 0. Since record 7 is not associated with the key of Counter_13, Counter_13 is not incremented and remains at a value of 1.

Upon receipt of record 8, a match rule key is generated based on the set of match rules previously defined. According to the field values of record 8, the second match rule key (Name, Phone) yields an undefined match rule key as record 8 does not include a value of a phone number. Therefore a single match rule key (adoe_ad@huj.com) results for record 8, based on the match rules. As there is no other match rule key, the high order key for record 8 is also the match rule key. Counter_12 that is associated with the high order key is incremented to a value of 0.

This process may continue for all records from record 102. When a key associated with one of the counters Counter_13, Counter_12, and Counter_11 is generated, the highest order key counter is incremented, and the counters of the sub-keys are decremented. The value of Counter_13 is greater than zero (or greater than or equals to 1) and will be used in the estimation of the distinct entities of the records 102. The Counter_13 is to be counted as a single entity. Consequently resulting in the records 5, 7, and 8 being counted as a single entity instead of three.

Figure 1D:
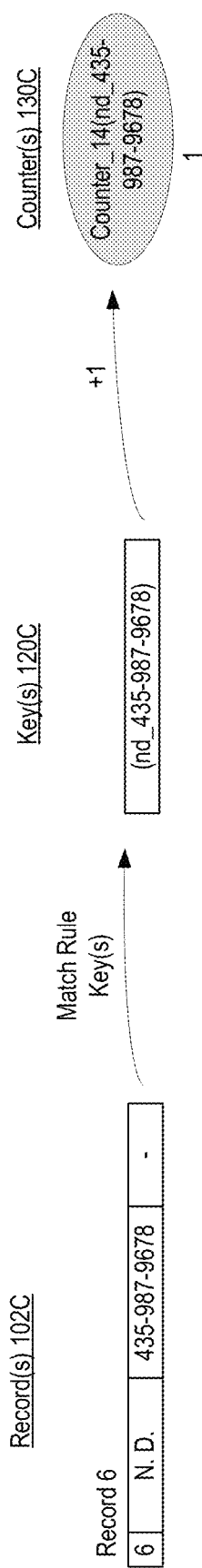
FIG. 1D is a more detailed block diagram illustrating the use of counters associated with keys determined based on match rules to estimate the number of distinct entities in a set of records, according to some example implementations.

FIG. 1D is a more detailed block diagram illustrating the use of counters associated with keys determined based on match rules to estimate the number of distinct entities in a set of records, according to some example implementations. The implementations of FIG. 1D will be described with the subset of records 102C from the records 102 and the first and second match rule keys described above. The subset of records 102C includes record 6 which is likely to be different from the previously identified entities (Alan Doe and John Smith).

Upon receipt of record 6, a match rule key is generated based on the set of match rules. According to the field values of record 6, the first match rule key (Name, Email) yields an undefined match rule key as record 6 does not include a value of an email address. Therefore, a single match rule key (nd_435-987-9678) results for record 6. As there is no other match rule key, the high order key for record 6 is also the match rule key. Counter_14 that is associated with the high order key is incremented to a value of 1.

This process may continue for all records from record 102. When a key associated with one of Counter_14 is generated, the highest order key counter is incremented. The value of Counter_14 is greater than zero (or greater than or equals to 1) and will be used in the estimation of the distinct entities of the records 102. Counter_14 is to be counted as a single entity. Consequently resulting in record 6 being counted as a single entity.

When all records 102 are processed, the determination of the number of counters with values that are greater than zero (i.e., greater than or equal to 1) is an estimation of the number of distinct entities in the set of records. Referring to the examples of FIGS. 1A-D and the records 102, the total number of distinct entities is estimated to be three, as there are three counters (Counter_4, Counter_13, and Counter_14) with values greater than zero.

While the examples discussed above show a particular order of processing of the records, this is intended to be exemplary only. The records are grouped in the illustrated subset of records to illustrate the behavior of duplicate and similar records and is not intended to illustrate the order of processing of these records by the distinct entity estimator 100. The records 102 can be processed in any given order without departing from the scope of the inventive concept presented herein.

Figure 2A:
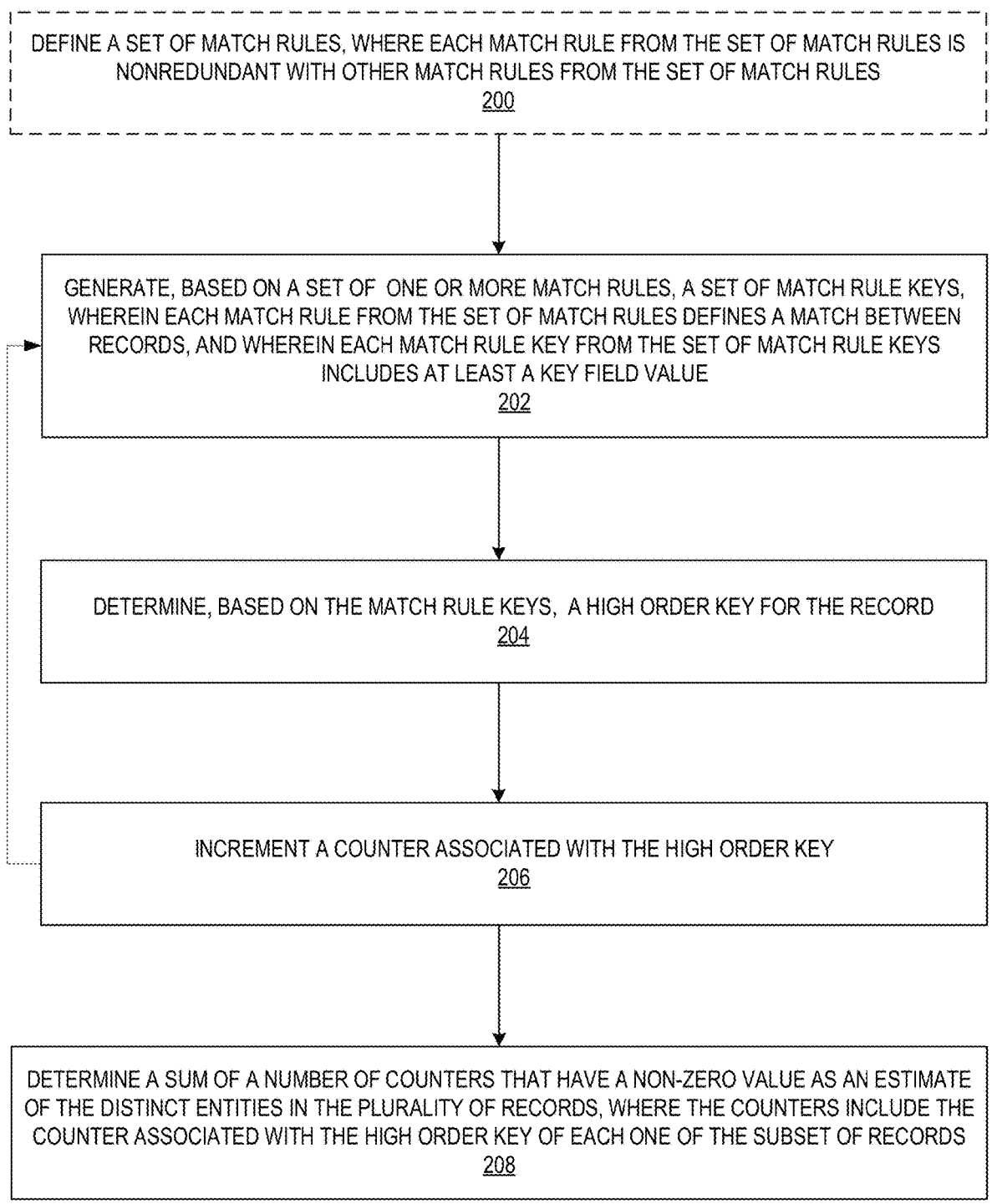
FIG. 2A is a flow diagram illustrating exemplary operations for estimating a number of distinct entities in the set of records of a database system according to some example implementations.

FIG. 2A is a flow diagram illustrating exemplary operations for estimating a number of distinct entities in the set of records of a database system according to some example implementations. The operations of FIG. 2A can be performed for a set of records already stored in a database storage system. In other implementations, the operations of FIG. 2A can be performed for a set of records that is received from a streaming application, where the records are continuously received and processed as they are received.

In some implementations, the operations include operation 200, at which a set of match rules is defined. Each match rule from the set of match rules defines a match between records. In other words, the match rule can be seen as a criteria that can be used for matching two records of a same record type. A match rule may include a set of one or more field types from the field types of a record indicating that for two records to match based on the match rule the values of the field types indicated in the match rule need to match. In some implementations, each match rule from the set of match rules is non-redundant with the other match rules from the set of match rules. The rules are non-redundant when no match rule from the set of match rules include another match rule as a subset. For example, each match rule is defined based on a different set of field types than the other fields types of any other match rule. Referring to the example of FIG. 1A, a first match rule, match rule 1, is defined with the field types "Name," and "Email;" a second match rule, match rule 2, is defined with the field types "Name," and "Phone". The first and the second match rule are non-redundant as the field types that are included in each match rule are different. The first match rule includes a field type "Email" that is not present in the second match rule and the second match rule includes a field type "Phone" that is not present in the first match rule.

The flow of operations then moves to operation 202, at which a set of match rule keys are generated, based on a set of one or more match rules. Each match rule key from the set of match rule keys includes at least a key field value. The key field value is determined from a corresponding field value identified in the match rule key. Referring to the example of FIG. 1A, for a record from the records 102, a set of match rule keys are generated by the key generator 110 based on the match rules 112. For example, for record 1: "John Smith, -, jsmith@xyz.com, 764, Alta St. CA" the following key (jsmith_jsmith@xyz.com) is generated from the first match rule, match rule 1. For this same record, there is no match rule key generated based on the second match rule, match rule 2, as record 1 does not include a phone number for the "Phone" field, therefore no match rule key is defined. In another example, record 3 may result in the generation of two match rule keys (jsmith_jsmith@xyz.com) and (jsmith_123_456_7890) as illustrated at the row 3 of the match rule key(s) 122.

The flow of operations then moves to operation 204, at which a high order key for the record is determined, based on the match rule keys. A high order key is formed from the set of match rule keys that are generated for the record. In some implementations, the high order key is formed from all unique and non-redundant field values that are included in the set of match rule keys. In some implementations, the set of match rule keys generated for a record includes a single match rule key, e.g., record 1 with match rule key "jsmith_jsmith@xyz.com", and the high order key for the record is the match rule key itself. In other implementations, the set of match rule keys may include more than one match rule key and the high order key is formed from field values from two or more match rule keys. For example, the composite key may include at least a first key field value of a first one of the set of match rule keys and at least a second key field value of a second one of the set of match rule keys. In some implementations, the composite key includes all distinct key fields from all non-null match rule keys generated from a record. Referring to the example of FIG. 1A, the high order key for the record 1 is the match rule key generated for record since the record has only a single match rule key. In contrast, the third record has two distinct match rule keys ("jsmith_jsmith@xyz.com" and "jsmith_123_456_7890") generated based on the match rules. Therefore, for the third record, the high order key is a key formed based on key field values from the two match rule keys. For example, the high order key includes all of the key field values that are part of all of the match rule keys: "jsmith_jsmith@ xyz.com_123-456-7890."

The flow then moves to operation 206, at which the counter associated with the high order key is incremented. In some implementations, when the high order key is the match rule key of the record, the counter is associated with the match rule key. Referring to the example of record 1 in FIG. 1B, the record has a single associated match rule key, and the high order key for record 1 is the match rule key, therefore counter_1 is incremented. Referring to the example of record 3 in FIG. 1B, record 3 has two match rule keys and consequently, the high order key is a composite key that is generated from the fields in the two match rule keys. In this example, the counter_4 that is associated with the high order key "jsmith_jsmith@xyz.com_123-456-7890" is incremented.

In some implementations, no match rule keys can be generated from a record. In these implementations, responsive to determining that no match rule key can be generated based on the match rule keys for a record, a no-match rule key counter is incremented. The no-match rule key counter can be used to estimate occurrences of records that do not include sufficient key field values to identify an entity in the set of records.

The operations 202-206 are repeated for multiple records. For example, the operations can be repeated for all the records for which an estimate of the number of unique entities is to be determined. In some implementations, the operations 202-206 can be repeated for all of the records of the database system, in other implementations, the operations can be repeated for a subset of all of the records of the database system, when the subset is less than the entire set of records. Based on the repetition of these operations, several counters can be incremented. For example, depending on the match rule keys used and the existing records, one or more of the counters from counter_1, counter_2, counter_3, counter_4, counter_5, counter_6, and counter_7 in FIG. 1A may be incremented. In another example, one or more of the counters from counter_1, counter_2, counter_3, counter_4, counter_11, counter_12, counter_13, or counter_14 of FIGS. 1B-D can be incremented.

The flow of operations then moves to operation 208, at which a sum of a number of counters that have a non-zero value is determined as an estimate of the distinct entities in the plurality of records. The counters include the counter associated with the high order key of each one of the subset of records. Thus, the number of counters that have a non-zero value (i.e., a value of one or greater) is determined and represents an estimation of the number of distinct entities of the records 102. In the illustrated examples of FIGS. 1B-D, the counters counter_4, counter_13, and counter_14 have non-zero values (or values greater than or equal to 1) resulting in an estimate of three distinct entities for the records 102. This estimation takes into account the duplicates records and ensure that these duplicates are not counted as distinct entities (e.g., records 1, 2, 3, and 4 are counted as a single entity). In addition, the estimation of the distinct entities can be used to estimate an average of duplicates in the set of records 102. For example, the total number of records can be divided by the estimated number of distinct entities to obtain an average number of duplicates.

FIG. 2B illustrate a flow diagram of exemplary operations that can be performed for decrementing counters, in accordance with some implementations. In some implementations, in addition to incrementing a high order key for a record, one or more sub-keys of the high order key can be decremented for that record. At operation 222, a determination of whether a set of sub-keys for the record includes at least one sub-key that is different from the high order key, is performed. Each one from the set of sub-keys is based at least in part on a match rule key from the set of match rule keys and is formed from less key field values than the entire key field values of the high order key. For example, a match rule key can be a sub-key of a high order key that includes key field values of at least two match rule keys. FIGS. 1B-1C illustrate examples of a high order keys that have sub-keys.

Upon determination that there is at least a sub-key that is different than the high order key, one or more sub-key counters are decremented. Each one of the sub-key counters is associated with a respective sub-key from the set of sub-keys. For example, with reference to FIG. 1B, Counter_1 and Counter_2, that are associated with sub-keys of the high order key are decremented for record 4. In the illustrated example, the sub-keys of the high order key are the match rule keys of record 4 and are respectively associated with Counter_1 and Counter_2. These counters are respectively decremented by 1 to a value of −1. In some embodiments, the counters can be decremented by another value. For example, the counters can be decremented by infinity (or a very large integer value that is greater than the total number of records in the set of records).

In some implementations, the sub-keys of the high order key can be composite keys. These composite keys can be referred to as intermediary composite keys. An intermediary composite key includes fewer key fields than the high order key and more key fields than each one of the set of match rule keys. The intermediary composite key is formed by key fields from at least two match rule keys. For example, when the records include additional fields such as a field address, the high order key can be a key including key field values from the four fields (e.g., name, email, phone, and address), and a sub-key can be either an intermediary composite key including three key field values (e.g., one of (name, phone, email), (name, phone, address), (name, email, address), (email, phone, address), . . . etc.). In other implementations, the sub-key can be the match rule key. Referring to the example of FIG. 1A, if a high order key is determined, Counter_7 is incremented and the counters Counter_4, Counter_5, Counter_6, Counter_1, Counter_2, and Counter_3 are decremented.

FIG. 2C illustrates a flow diagram of exemplary operations that can be performed for generating match rule keys, in accordance with some implementations. In some implementations, generation a match rule key includes operations 242-244. At operation 242, a respective set of key field values is generated from a set of field values of the records. The set of field values of the record correspond to the set of fields identified in the match rule key. At operation 244, a match rule key that corresponds to the match rule is generated when all the respective set of key field values are non-null.

Figure 2D:
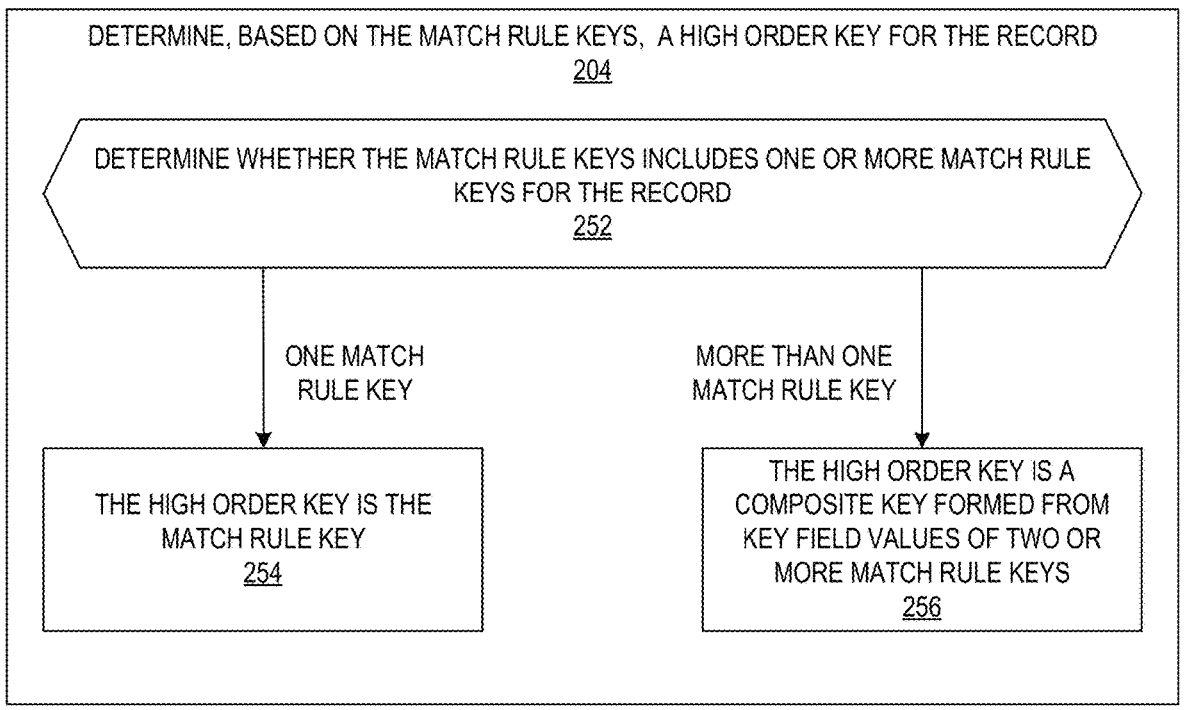
FIG. 2D illustrates a flow diagram of exemplary operations that can be performed for determining the high order key for a record, in accordance with some implementations.

FIG. 2D illustrates a flow diagram of exemplary operations that can be performed for determining the high order key for a record, in accordance with some implementations. In some implementations operation 204 includes operations 252-256. At operation 252, a determination of whether the match rule keys includes one or more match rule keys for the record is performed. Upon determining that the match rule keys include a single match rule key, the flow of operations moves to operation 256, and the high order key is the match rule key. Upon determining that the match rule keys include two or more match rule keys, the flow of operations moves to operation 254, and the high order key is a composite key formed from key field values of two or more match rule keys.

The implementations described herein present an efficient mechanism for estimating the number of distinct entities in a set of records. In the implementations described the estimation of distinct entities in a set of records is performed without performing any matching or clustering operations. The estimation of the number of entities in the set of records can be performed in one pass over the set of records significantly increasing the performance of the estimation operation when compared with existing estimating mechanisms. Thus, the mechanisms presented herein can be used to perform a quick light weight assessment of distinct entities in a data set. For example, these mechanisms can be used in a multi-tenant system to assess the number of distinct entities of a record type (e.g., an estimate of distinct customers of a tenant) for a given tenant from multiple tenants. The number of estimated distinct entities can be used, when compared to the total number of records in the data set, to estimate the average number of duplicates included in the set of records.

Exemplary Electronic Devices

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3A:
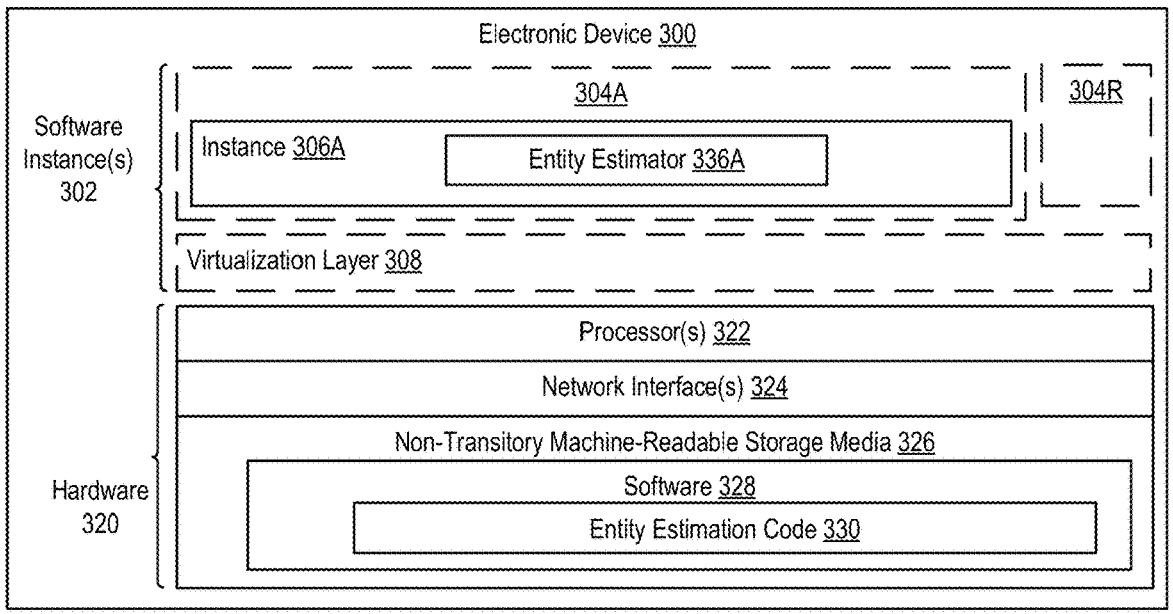
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described database system 100 and distinct entities estimator 100 may be implemented in one or more electronic devices 300.

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Databases

Databases may be implemented according to a variety of different database models, such as relational, non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data).

In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In the context of a relational database, each relational database table (which is a type of database object) generally contains one or more data categories logically arranged as columns according to a schema, where the columns of the relational database table are different ones of the fields from the plurality of records, and where each row of the relational database table are different ones of a plurality records and contains an instance of data for each category defined by the fields. Thus, the fields of a record are defined by the structure of the database object to which it belongs. By way of example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

Exemplary Environment

Figure 3B:
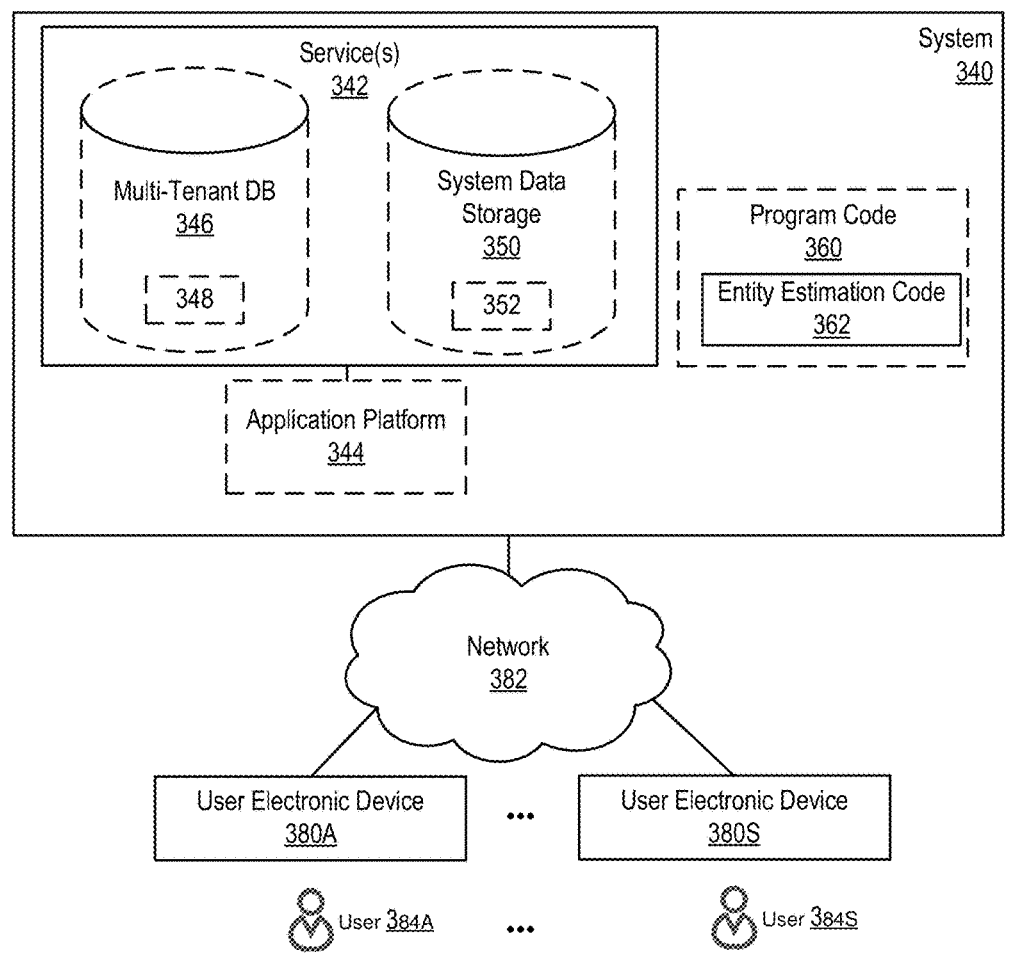
FIG. 3B is a block diagram of an environment where a distinct entities estimator may be deployed, according to some implementations.

FIG. 3B is a block diagram of an environment where an estimation of distinct entities of records can be performed by a distinct entities estimator, according to some implementations. A system 340 includes hardware (a set of one or more electronic devices) and software to provide service(s) 342, including the distinct entities estimator 100. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communication with each other and/or with one or more of the user electronic devices 380A-S via one or more Application Programming Interface(s) (APIs) (e.g., a Representational State Transfer (REST) API). The user electronic devices 380A-S are operated by users 384A-S.

In one implementation, the system 340 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may utilize one or more multi-tenant databases 346 for tenant data 348, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the distinct entity estimator 100, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of estimating a number of distinct entities in a plurality of records of a database system, the method comprising:
for each one of a subset of records from the plurality of records:
generating, based on a set of one or more match rules, a set of match rule keys, wherein each match rule from the set of match rules defines a match between records, and wherein each match rule key from the set of match rule keys includes at least a key field value,
determining, based on the match rule keys, a high order key for the record, and
incrementing a counter associated with the high order key; and
determining a sum of a number of counters that have a non-zero value as an estimate of the distinct entities in the plurality of records, wherein the counters include the counter associated with the high order key of each one of the subset of records.

2. The method of claim 1 further comprising:
for each one of the subset of records from the plurality of records:
responsive to determining that a set of one or more sub-keys for the record includes at least one sub-key that is different from the high order key, wherein each one from the set of sub-keys is based at least in part on a match rule key from the set of match rule keys and is formed from fewer key field values than all key field values of the high order key, decrementing one or more sub-key counters, wherein each one of the sub-key counters is associated with a respective sub-key from the set of sub-keys.

3. The method of claim 2, wherein the set of sub-keys includes the set of match rule keys and a set of intermediary composite keys, wherein each one from the set of intermediary composite keys includes fewer key fields than the high order key and more key fields than each one of the set of match rule keys, and wherein each one from the set of the intermediary composite keys are formed by key fields from at least two match rule keys.

4. The method of claim 1 further comprising:
for at least one of the plurality of records:
responsive to determining that no match rule key can be generated based on the match rule keys for the at least one of the plurality of records, incrementing a no-match rule key counter.

5. The method of claim 1, wherein the high order key includes at least a first key field value of a first one of the set of match rule keys and at least a second key field value of a second one of the set of match rule keys.

6. The method of claim 1, wherein the high order key includes all distinct key fields from all non-null match rule keys generated from a record.

7. The method of claim 1, wherein each match rule from the set of match rules identifies a set of fields, and wherein generating the set of match rule keys for a record includes:
for each match rule from the set of match rules:
generating a respective set of key field values from a set of field values of the records that correspond to the set of fields identified in the match rule key, and
generating a match rule key that corresponds to the match rule when all the respective set of key field values are non-null.

8. The method of claim 1, further comprising:
defining the set of match rules, wherein for each match rule from the set of match rules is nonredundant with other match rules from the set of match rules.

9. A non-transitory machine-readable storage medium that provides instructions that, if executed by a processor for estimating a number of distinct entities in a plurality of records of a database system, will cause said processor to perform operations comprising:
for each one of a subset of records from the plurality of records:
generating, based on a set of one or more match rules, a set of match rule keys, wherein each match rule from the set of match rules defines a match between records, and wherein each match rule key from the set of match rule keys includes at least a key field value,
determining, based on the match rule keys, a high order key for the record, and
incrementing a counter associated with the high order key; and
determining a sum of a number of counters that have a non-zero value as an estimate of the distinct entities in the plurality of records, wherein the counters include the counter associated with the high order key of each one of the subset of records.

10. The non-transitory machine-readable storage medium of claim 9, wherein the operations further comprise:
for each one of the subset of records from the plurality of records:
responsive to determining that a set of one or more sub-keys for the record includes at least one sub-key that is different from the high order key, wherein each one from the set of sub-keys is based at least in part on a match rule key from the set of match rule keys and is formed from fewer key field values than all key field values of the high order key, decrementing one or more sub-key counters, wherein each one of the sub-key counters is associated with a respective sub-key from the set of sub-keys.

11. The non-transitory machine-readable storage medium of claim 10, wherein the set of sub-keys includes the set of match rule keys and a set of intermediary composite keys, wherein each one from the set of intermediary composite keys includes fewer key fields than the high order key and more key fields than each one of the set of match rule keys, and wherein each one from the set of the intermediary composite keys are formed by key fields from at least two match rule keys.

12. The non-transitory machine-readable storage medium of claim 9, wherein the operations further comprise:
for at least one of the plurality of records:
responsive to determining that no match rule key can be generated based on the match rule keys for the at least one of the plurality of records, incrementing a no-match rule key counter.

13. The non-transitory machine-readable storage medium of claim 9, wherein the high order key includes at least a first key field value of a first one of the set of match rule keys and at least a second key field value of a second one of the set of match rule keys.

14. The non-transitory machine-readable storage medium of claim 9, wherein the high order key includes all distinct key fields from all non-null match rule keys generated from a record.

15. The non-transitory machine-readable storage medium of claim 9, wherein each match rule from the set of match rules identifies a set of fields, and wherein generating the set of match rule keys for a record includes:
for each match rule from the set of match rules:
generating a respective set of key field values from a set of field values of the records that correspond to the set of fields identified in the match rule key, and
generating a match rule key that corresponds to the match rule when all the respective set of key field values are non-null.

16. The non-transitory machine-readable storage medium of claim 9, wherein the operations further comprise:
defining the set of match rules, wherein for each match rule from the set of match rules is nonredundant with other match rules from the set of match rules.

17. A machine for estimating a number of distinct entities in a plurality of records of a database system, the machine comprising:
a non-transitory machine-readable storage medium that provides instructions that, if executed by a processor, will cause the machine to perform operations comprising,
for each one of a subset of records from the plurality of records:
generating, based on a set of one or more match rules, a set of match rule keys, wherein each match rule from the set of match rules defines a match between records, and wherein each match rule key from the set of match rule keys includes at least a key field value,
determining, based on the match rule keys, a high order key for the record, and
incrementing a counter associated with the high order key; and
determining a sum of a number of counters that have a non-zero value as an estimate of the distinct entities in the plurality of records, wherein the counters include the counter associated with the high order key of each one of the subset of records.

18. The machine of claim 17, wherein the operations further comprise:
for each one of the subset of records from the plurality of records:
responsive to determining that a set of one or more sub-keys for the record includes at least one sub-key that is different from the high order key, wherein each one from the set of sub-keys is based at least in part on a match rule key from the set of match rule keys and is formed from fewer key field values than all key field values of the high order key, decrementing one or more sub-key counters, wherein each one of the sub-key counters is associated with a respective sub-key from the set of sub-keys.

19. The machine of claim 18, wherein the set of sub-keys includes the set of match rule keys and a set of intermediary composite keys, wherein each one from the set of intermediary composite keys includes fewer key fields than the high order key and more key fields than each one of the set of match rule keys, and wherein each one from the set of the intermediary composite keys are formed by key fields from at least two match rule keys.

20. The machine of claim 17, wherein the operations further comprise:
for at least one of the plurality of records:
responsive to determining that no match rule key can be generated based on the match rule keys for the at least one of the plurality of records, incrementing a no-match rule key counter.

21. The machine of claim 17, wherein the high order key includes at least a first key field value of a first one of the set of match rule keys and at least a second key field value of a second one of the set of match rule keys.

22. The machine of claim 17, wherein the high order key includes all distinct key fields from all non-null match rule keys generated from a record.

23. The machine of claim 17, wherein each match rule from the set of match rules identifies a set of fields, and wherein generating the set of match rule keys for a record includes:
for each match rule from the set of match rules:
generating a respective set of key field values from a set of field values of the records that correspond to the set of fields identified in the match rule key, and
generating a match rule key that corresponds to the match rule when all the respective set of key field values are non-null.

24. The machine of claim 17, wherein the operations further comprise:
defining the set of match rules, wherein for each match rule from the set of match rules is nonredundant with other match rules from the set of match rules.

* * * * *